United States Patent [19]

Washio et al.

[11] Patent Number: 5,055,974

[45] Date of Patent: Oct. 8, 1991

[54] ELECTROLYTE FOR USE IN ELECTROLYTIC CAPACITORS

[75] Inventors: Yukari Washio, Kyoto; Nobuhiro Takeishi, Hirakata; Hideki Shimamoto, Tsuzuki; Keiji Mori, Joyo; Noriki Ushio, Joyo; Katsuji Shiono, Ohtsu; Takaaki Kishi, Uji; Hideo Samura, Ohta, all of Japan

[73] Assignee: Matsushita Electric Industrial Co., Ltd., Osaka, Japan

[21] Appl. No.: 595,727

[22] Filed: Oct. 9, 1990

Related U.S. Application Data

[63] Continuation-in-part of Ser. No. 462,255, Jan. 9, 1990, abandoned.

[30] Foreign Application Priority Data

| Jan. 11, 1989 | [JP] | Japan | 1-4327 |
| Mar. 22, 1989 | [JP] | Japan | 1-69454 |
| Nov. 28, 1989 | [JP] | Japan | 1-308131 |

[51] Int. Cl.$^5$ .............................................. H01G 9/02
[52] U.S. Cl. .................................... 361/527; 252/62.2
[58] Field of Search ................ 361/525, 527; 292/62.2

[56] References Cited

U.S. PATENT DOCUMENTS

| 3,403,304 | 9/1968 | Ross et al. | 252/62.2 X |
| 3,403,340 | 9/1968 | Becker et al. | 325/42 |
| 3,585,459 | 6/1971 | Hills et al. | 252/62.2 X |
| 4,786,429 | 11/1988 | Mori et al. | 252/62.2 |

FOREIGN PATENT DOCUMENTS

| 63-1021 | 1/1988 | Japan. |
| 1-157514 | 6/1989 | Japan. |
| 1-194313 | 8/1989 | Japan. |
| 2143228 | 2/1985 | United Kingdom. |

OTHER PUBLICATIONS

European Search Report Dated Mar. 30, 1990.

*Primary Examiner*—Donald A. Griffin
*Attorney, Agent, or Firm*—Panitch Schwarze Jacobs & Nadel

[57] ABSTRACT

An electrolyte for use in electrolytic capacitors is provided. The electrolyte comprises a specified quaternary ammonium salt of a boric acid complex as a solute. A capacitor in which the electrolyte is used displays stable electrical characteristics at high temperatures as well as high sparking voltage and long life.

14 Claims, 1 Drawing Sheet

ELECTROLYTE FOR USE IN ELECTROLYTIC CAPACITORS

This application is a continuation-in-part of our co-pending U.S. patent application Ser. No. 462,255, filed Jan. 9, 1990, now abandoned.

BACKGROUND OF THE INVENTION

1. Field of the Invention

The present invention relates to electrolytes for electrolytic capacitors and electrolytic capacitors using the said electrolytes.

2. Description of the Prior Art

Amine salts of phthalic acid or maleic acid are generally used as solutes contained in electrolytes for low voltage electrolytic capacitors with a rated voltage in the range of 6.3 to 100 V. Examples of the use of boron complexes of oxalic or maleic acid for this purpose are disclosed in Japanese Laid-Open Patent Publications Nos. 1-194313 and 1-157514. Adipic acid or its ammonium salt is used as a solute contained in electrolytes for intermediate voltage electrolytic capacitors with rated voltages in the range of 160 to 250 V. However, these electrolytes have the disadvantages of low specific conductivity as well as a further pronounced decrease of specific conductivity when exposed to high temperatures. With a view to avoiding this defect, examples of the use of quaternary ammonium salts of boric acid for this purpose are disclosed in Japanese Laid-Open Patent Publication No. 63-1021, while examples of the use of quaternary ammonium salts of catechol complexes of boric acid for this purpose are disclosed in U.S. Pat. No. 3,403,304. As solutes for the electrolytes of high voltage electrolytic capacitors with rated voltages in the range of 350 to 500 V, 1,6-decanedicarboxylic acid or its salts are generally used.

However, if amine salts of phthalic or maleic acid, or boron complexes of oxalic acid, maleic acid or catechol are used as the solute, then, since the sparking voltage is low, the electrolyte cannot be used in capacitors with rated voltages in the range of 6.3 to 100 V. Moreover, if quaternary ammonium salts of boric acid are used, then, since the solubility with respect to aprotic solvents is low, various shortcomings arise, such as precipitation under low temperature conditions, etc. Furthermore, if alcoholic solvents such as ethylene glycol, etc., are used to dissolve these solutes, then esterification reactions proceed at high temperatures, resulting in pronounced increases in the water content of the electrolyte. This water in turn reacts with the aluminum composing the electrodes of capacitor elements, which causes marked deterioration of electrical characteristics and reduction in lifetime of the capacitors.

If 1,6-decanedicarboxylic acid or its salts are used as solutes for the electrolytes for use in electrolytic capacitors, then the specific conductivity is low, and various problems arise, in particular, the impedance characteristics of the capacitor display marked adverse effects at low temperatures.

SUMMARY OF THE INVENTION

The electrolyte of this invention for use in electrolytic capacitors, which overcomes the above-discussed and numerous other disadvantages and deficiencies of the prior art, comprises as a solute at least one kind of quaternary ammonium salt of a boric acid complex with an alcoholic-hydroxy containing compound, said quaternary ammonium salt being of the formula I:

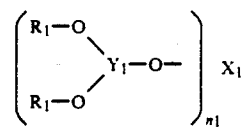

where $n_1$ is an integer of 1 or more;

$X_1$ is a moiety selected from the group consisting of (i) a residue obtained by removing $n_1$ hydroxyl group or groups from a compound containing at least $n_1$ alcoholic hydroxyl groups, (ii) a group of the formula $-Y_1-(O-R_1)_2$ or $\geqslant Y_1-O-R_1$, and (iii) a group of the formula I-A:

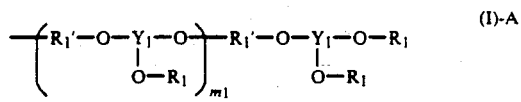

wherein $m_1$ is an integer of zero or more, $R_1'$ is a residue obtained by removing two hydroxyl groups from a compound containing at least two alcoholic hydroxyl groups;

$Y_1$ is a group selected from the group consisting of $\geqslant B-O-R_1)^-.Q_1^+$ and $\geqslant B-$, the $Q_1^+$ being a quaternary ammonium ion, with the proviso that at least one of the $Y_1$ groups in the general formula I is $\geqslant B-O-R_1)^-.Q_1^+$; and $R_1$s are independently hydrogen, alkyl, aralkyl, or derivatives thereof, said derivatives of alkyl and aralkyl containing at least one selected from the group consisting of hydroxy groups, ether linkages, ketone groups and S-containing groups, and said two $R_1$ groups or an $R_1$ and $X_1$ group may be joined together through a —O—B—O— group to form a ring structure containing boron.

Another electrolyte of this invention for use in electrolytic capacitors comprises as a solute a mixture of at least one kind of quaternary ammonium salt of a boric acid complex with an alcoholic-hydroxy containing compound, and at least one kind of quaternary ammonium salt of a boric acid complex with hydroxycarboxylic acid, said quaternary ammonium salt being of the formula II:

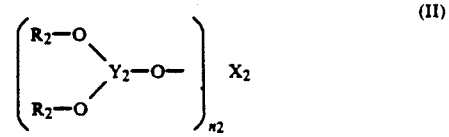

wherein $n_2$ is an integer of 1 or more;

$X_2$ is a moiety selected from the group consisting of (i) a residue obtained by removing $n_2$ hydroxyl group or groups from a compound containing at least $n_2$ alcoholic hydroxyl groups, (ii) a group of the formula $-Y_2-(O-R_2)_2$ or $\geqslant Y_2-O-R_2$, and (iii) a group of the formula II-A:

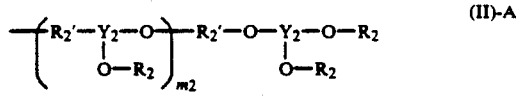

wherein $m_2$ is an integer of zero or more, $R_2'$ is a residue obtained by removing two OH groups from a polyhydric alcohol or hydroxycarboxylic acid;

$Y_2$ is a group selected from the group consisting of B—O—$R_2$)$^-$.$Q_2^+$ and >B—, the $Q_2^+$ being a quaternary ammonium ion, with the proviso that at least one of the $Y_2$ groups in the general formula II is B—O—$R_2$)$^-$.$Q_2^+$; and $R_2$s are independently hydrogen; alkyl; aralkyl; a residue of a hydroxycarboxylic acid compound of the formula $$-\overset{O}{\underset{\parallel}{C}}-A,$$

wherein A is alkyl or aralkyl having at least one hydroxyl group and optionally having at least one carboxyl group, or derivatives thereof; said derivatives of alkyl, aralkyl and $$-\overset{O}{\underset{\parallel}{C}}-A$$

containing at least one selected from the group consisting of hydroxy groups, ether linkages, ketone groups, N-containing groups and S-containing groups, and said two $R_2$ groups or an $R_2$ and $X_2$ group may be joined together through a —O—B—O— group to form a ring structure containing boron.

Another electrolyte of this invention for use in electrolytic capacitors comprises as a solute at least one kind of quaternary ammonium salt of a boric acid complex with phosphoric acid and/or phosphoric acid ester, said quaternary ammonium salt being of the formula III:

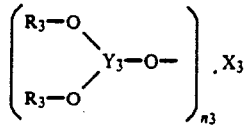 (III)

where $n_3$ is an integer of 1 or more;

$X_3$ is a moiety selected from the group consisting of (i) a residue obtained by removing $n_3$ hydroxyl groups from phosphoric acid and/or phosphate, (ii) a group of the formula =$Y_3$—O—$R_3$, and (iii) a group of the formula III-A:

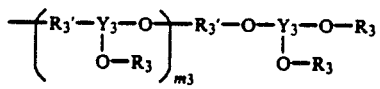 (III)-A wherein $m_3$ is an integer of zero or more, $R_3'$ is a residue obtained by removing two hydroxyl groups from phosphoric acid or ester thereof containing at least two alcoholic hydroxyl groups;

$Y_3$ is a group selected from the group consisting of $\geqslant$B—O—$R_3$)$^-$.$Q_3^+$ and $\geq$B—, the $Q_3^+$ being a quaternary ammonium ion, with the proviso that at least one of the $Y_3$ groups in the general formula III is $\geqslant$B—O—$R_3$)$^-$.$Q_3^+$; and $R_3$s are independently hydrogen, a residue of phosphoric acid or ester thereof shown by formula III-B:

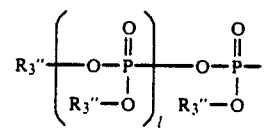 (III)-B wherein $l$ is 0 or 1; $R_3''$s are independently hydrogen, alkyl, aralkyl or derivatives thereof, said derivatives of alkyl and aralkyl containing at least one selected from the group consisting of hydroxy groups, ether linkages, and S-containing groups, and said two $R_3$ groups or an $R_3$ and $X_3$ group may be joined together through a —O—B—O— group to form a ring structure containing boron.

Another electrolyte of this invention for use in electrolytic capacitors comprises as a solute at least one kind of quaternary ammonium salt of a boric acid complex with a monocarboxylic compound, said quaternary ammonium salt being of the formula IV:

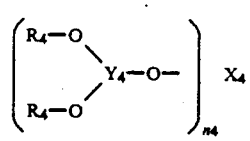 (IV)

wherein $n_4$ in an integer or 1 or more;

$X_4$ is a moiety selected from the group consisting of (i) a residue of a monocarboxylic acid compound of the formula $$-\overset{O}{\underset{\parallel}{C}}-A,$$

wherein A is hydrogen, alkyl or aryl, and (ii) a group of the formula —$Y_4$—(—O—$R_4$)$_2$ or =$Y_4$—O—$R_4$;

$Y_4$ is a group selected from the group consisting of (iii) a group of the formula B—O—$R_4$)$^-$.$Q_4^+$ and (iv) $\geq$B—, $Q_4^+$ being a quaternary ammonium ion with the proviso that at least one of the $Y_4$ groups in formula IV is B—O—$R_4$)$^-$.$Q_4^+$, $R_4$ is selected from the group consisting of (v) hydrogen and (vi) a residue of an monocarboxylic acid compound of the formula $$-\overset{O}{\underset{\parallel}{C}}-A,$$

wherein A is hydrogen, alkyl, aryl or derivatives thereof, said derivatives of alkyl and aryl containing at least one amino group;

said two $R_4$ groups or an $R_4$ and $X_4$ group may be joined together through a —O—B—O— group to form a ring structure containing boron.

In a preferred embodiment, the quaternary ammonium ion is asymmetric.

The electrolytic capacitor of this invention comprises a capacitor element having an anode, a cathode and a separator disposed therebetween, wherein said capacitor element is impregnated with one of the above-mentioned electrolytes.

Thus, the invention described herein makes possible the objectives of:

(1) providing an electrolyte for electrolytic capacitors, in which the solute that is contained displays high solubility and a high degree of dissociation, and the electrolyte possess high specific conductivity;

(2) providing an electrolyte for electrolytic capacitors, such that the electrolytes are free from defects such as marked increases in the water content of the capacitor system resulting from esterification of the solute, etc;

(3) providing an electrolyte for electrolytic capacitors, such that capacitors in which the said electrolytes are used possess high sparking voltage, so that the said electrolytes are suitable for use in high voltage electrolytic capacitors; and (4) providing an electrolytic capacitor employing an electrolyte with the superior properties mentioned above, such that the said electrolytic capacitors display stable electrical characteristics at high temperatures as well as high sparking voltage and long life.

BRIEF DESCRIPTION OF THE DRAWING

This invention may be better understood and its numerous objects and advantages will become apparent to those skilled in the art by reference to the accompanying drawing as follows.

DESCRIPTION OF THE PREFERRED EMBODIMENTS

Figure 1:
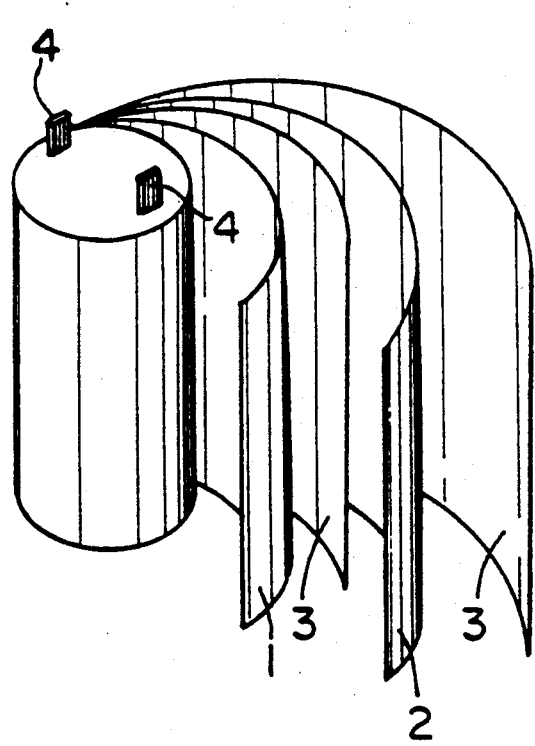
FIG. 1 is a perspective view of the capacitor elements in the electrolytic capacitors of the present invention.

The present inventors have devoted intense research to the development of electrolytes with high specific conductivity which can form electrolytic capacitors with high sparking voltage and are stable at high temperatures, and have thereby succeeded in completing the present invention.

The quaternary ammonium salt of a boric acid complex with an alcoholic-hydroxy containing compound used in the present invention is represented by the general formula I:

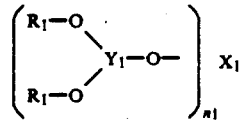
(I)

where $n_1$ is an integer of 1 or more;

$X_1$ is a moiety selected from the group consisting of (i) a residue obtained by removing $n_1$ hydroxyl group or groups from a compound containing at least $n_1$ alcoholic hydroxyl groups, (ii) a group of the formula $-Y_1-(-O-R_1)_2$ or $\_Y_1-O-R_1$, and (iii) a group of the formula I-A:

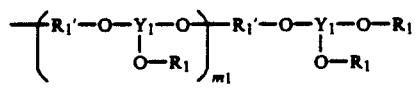
(I)-A wherein $m_1$ is an integer of zero or more, $R_1{'}$ is a residue obtained by removing two hydroxyl groups from a compound containing at least two alcoholic hydroxyl groups;

$Y_1$ is a group selected from the group consisting of $\equiv$B—O—R$_1$)$^-$.Q$_1{^+}$ and $>$B—, the Q$_1{^+}$ being a quaternary ammonium ion, with the proviso that at least one of the $Y_1$ groups in the general formula I is $\equiv$B—O—R$_1$)$^-$.Q$_1{^+}$; and R$_1$s are independently hydrogen, alkyl, aralkyl, or derivatives thereof, said derivatives of alkyl and aralkyl containing at least one selected from the group consisting of hydroxy groups, ether linkages, ketone groups and S-containing groups.

In the general formula I, the alcoholichydroxy containing compound which can form the $X_1$ can be classified into three categories, as follows.

(a) Compounds possessing one alcoholic hydroxyl group;

(b) Compounds having at least two vicinal alcoholic hydroxyl groups;

(c) saturated linear aliphatic compounds having two alcoholic hydroxyl groups, and having no vicinal alcoholic hydroxyl groups;

(d) unsaturated aliphatic compounds having two alcoholic hydroxyl groups, and having no vicinal alcoholic hydroxyl groups:

(e) alicyclic compounds having two alcoholic hydroxyl groups, and having no vicinal alcoholic hydroxyl groups;

(f) ether-group containing compounds having two alcoholic hydroxyl groups, and having no vicinal alcoholic hydroxyl groups;

(g) sulfur-containing compounds having two alcoholic hydroxyl groups, and having no vicinal alcoholic hydroxyl groups;

(h) nitrogen-containing compounds having two alcoholic hydroxyl groups, and having no vicinal alcoholic hydroxyl groups;

(i) phosphorus-containing compounds having two alcoholic hydroxyl groups, and having no vicinal alcoholic hydroxyl groups; and (j) compounds having more than two alcoholic hydroxyl groups, and having no vicinal alcoholic hydroxyl groups.

Examples of the compounds of category (a) include linear or branched, saturated or unsaturated aliphatic primary alcohols with 1 to 18 carbon atoms; saturated or unsaturated alicyclic primary alcohols; primary alcohols containing at least one ether linkage with a molecular weight of 76 to 10,000; and primary alcohols containing at least one hetero atom.

The saturated or unsaturated aliphatic primary alcohols include methanol, ethanol, isopropanol, n-butanol, sec-butanol, tert-butanol, 2-ethylhexanol, allyl alcohol and propargyl alcohol. The saturated or unsaturated alicyclic primary alcohols include cyclohexanol, methylcyclohexanol, borneol and terpineol. The primary alcohols containing at least one ether group include polyalkylene glycol monoalkyl ether and polyoxyalkylenemono-ol disclosed in the specification of U.S. Pat. No. 4,116,846 such as Methyl cellosolve ®, Ethyl cellosolve ®, Butyl cellosolve ®, Methyl carbitol ®, Ethyl carbitol ® and Butyl carbitol ®. The primary alcohols containing at least one hetero atom include furfuryl alcohol, tetrahydrofurfuryl alcohol, thiophenmethanol, 2-mercaptoethanol, 4-hydroxy-2-butanone, hydroxyacetone and methylolacrylamide. Benzyl alcohol can also be used.

The compounds of above-mentioned category (b) can be shown by the following formula:

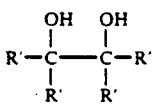

wherein R's are independently hydrogen, alkyl, or aralkyl, or derivatives thereof, said derivatives of alkyl and aralkyl containing at least one selected from the group consisting of hydroxy groups, ether linkages and s-containing groups.

As these compounds, it is possible to use saturated or unsaturated aliphatic polyols, saturated or unsaturated alicyclic polyols, sugar alcohol and polyols containing at least one ether group as follows. Examples of the aliphatic polyols include ethylene glycol, propylene glycol, ethylethylene glycol, 2,3-butanediol, pinacol, 1,2-hexanediol, 1,2-decanediol, 1,2-dodecanediol, glycerol, 1,2,4-trihydroxybutane, 1,2,3-heptatriol, 1,2,6-trihydroxyhexane, 1,2,3,4-tetrahydroxybutane, 1,2,7,8-tetrahydroxyoctane, 5-hexene-1,2-diol and 7-octen-1,2-diol. The alicyclic polyols include 1,2-cyclopentanediol, 1,2-cyclohexanediol, 1,2-cycloheptanediol, inositol, and 3,5-hexadiene-1,2-diol. The sugar alcohols include erythritol, ribitol, xylitol, sorbitol, mannitol and dulcitol. The polyols containing ether groups include 3-methoxy-1,2-propanediol, 3-ethoxy-1,2-propanediol, 3-propoxy-1,2-propanediol, 3-butoxy-1,2-propanediol, 3-phenylmethoxy-1,2-propanediol, 3-benzyloxy-1,2-propanediol, diglycerol and triglycerol.

As the compounds of categories (c) to (j), it is possible to use saturated or unsaturated aliphatic polyols, saturated or unsaturated alicyclic polyols, and polyols containing at least one ether groups with a molecular weight of 106 to 10,000, as described below. Examples of aliphatic polyols include trimethylene glycol, 1,3-butanediol, 1,4-butanediol, 2,4-pentanediol, 1,5-pentanediol, neopentyl glycol, 1,6-hexanediol, 2,5-hexanediol, 2-methyl-1,3-pentanediol, hexylene glycol, 2,2-dimethylolbutane, 2,4-heptanediol, 2-ethyl-1,3-hexanediol, 2-ethyl-2-n-butyl-1,3-propanediol, cis-2-butene-1,4-diol, trans-2-butene-1,4-diol, 2-butyne-1,4-diol, dimethylhexynediol, trimethylolpropane and pentaerythritol. The alicyclic polyols include 1,4-cyclohexanediol, cyclohexane-1,3,5-triol, and 4-cyclohexene-1,3-diol. The polyols containing at least one ether group containing diethylene glycol, triethylene glycol, tetraethylene glycol, dipropylene glycol, tripropylene glycol, tetrapropylene glycol, polyethylene glycol, polypropylene glycol, polybutylene glycol, copolymer of ethylene glycol, propylene glycol or butylene glycol copolymer and polyoxyalkylenepolyol disclosed in U.S. Pat. No. 4,116,846. Furthermore, sulfur-containing polyols such as thiodiethylene glycol and 2,2'-(decamethylenedithio)dimethanol; nitrogen-containing polyols such as diethanolamine, N-methyldiethanolamine, triethanolamine, 1,4-bis(2-hydroxyethyl)piperazine and tris(hydroxymethyl)aminomethane; phosphorus-containing polyols such as tris(hydroxymethyl)phosphinoxyde; and polymers containing alcoholic hydroxyl groups such as polyhydroxyethyl (meth)acrylate having a molecular weight of 234 to 45,000, polyvinylalcohol having a molecular weight of 90 to 45,000 and vinylalcohol-hydroxyethyl (meth)acrylate copolymer having a molecular weight of 162 to 45,000 can also be used.

Mixtures of alcoholic-hydroxy containing compounds from two or more of these categories may also be employed. For example, mixtures of compounds from categories (a) to (j) may be used.

In formula I the group $R_1$ can be selected from the group consisting of hydrogen, straight-chain or branched alkyl with 1 to 18 carbon atoms, aralkyl, and derivatives thereof. The said derivatives of alkyl and aralkyl contain at least one selected from the group consisting of hydroxyl groups, ether linkage, ketone groups and sulfur-containing groups.

Examples of the alkyl groups include methyl, ethyl, n-propyl, isopropyl, n-butyl, hexyl and octyl. Cycloalkyl groups such as cyclohexyl, cyclopentyl and methylcycloalkyl groups can also be used. Aralkyl groups include benzyl. Derivatives include furfuryl, tetrahydrofurfuryl, thiophenmethyl and residues of the abovementioned alcoholic-hydroxy containing compounds (obtained by removing one hydroxyl group thereof). In addition, $R_1s$ can be unsaturated hydrocarbon groups such as allyl, propargyl and crotyl.

Examples of $R_1'$ include residues obtained by removing two hydroxyl groups from a compound containing two or more alcoholic hydroxyl groups in one of the categories 2 or 3 mentioned above.

In formula I, the value of $n_1$ is ordinarily at least 1, preferably 1 to 8, and more preferably 1 to 3, while the value of $m_1$ is ordinarily at least 1, preferably 1 to 11 and more preferably 1 to 6.

As the aforesaid quaternary ammonium salt of a boric acid complex with an alcoholic-hydroxy containing compound, the use of a compound such that two $R_1$ groups or $R_1$ and $X_1$ groups are joined together through a —O—B—O— group to form a ring structure containing boron is also appropriate.

This type of compound is represented, for example, by the following formulae:

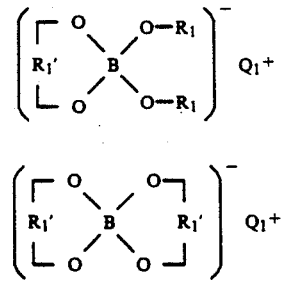

wherein $R_1$, $R_1'$ and $Q_1^+$ are as defined in formula I.

As examples of the quaternary ammonium salt of a boric acid complex with an alcoholic-hydroxy containing compound, for example, salts obtained from quaternary ammonium hydroxide and a boric acid complex with an alcoholic-hydroxy containing compound, disclosed in U.K. Patent No. 1,323,312 and U.S. Pat. No. 4,192,759 are listed. Also, as compounds such that two $R_1$ groups or an $R_1$ and an $X_1$ group are joined to form a ring structure containing boron, for example, the compounds disclosed in U.K. Patent No. 1,341,901, are listed. In the compounds, a portion or all of the boron atoms in a boric acid ester are quaternary ammoniated.

The mixture of at least one kind of quaternary ammonium salt of a boric acid complex with alcoholic-hydroxy containing compound and at least one kind of quaternary ammonium salt of boric acid complex with hydroxycarboxylic acid, which is used in the present invention, is represented by the general formula II:

$$\left[ \begin{array}{c} R_2-O \\ \phantom{R_2-O}\diagdown \\ \phantom{RR}Y_2-O- \\ \phantom{R_2-O}\diagup \\ R_2-O \end{array} \right]_{n_2} X_2 \quad (II)$$

wherein $n_2$ is an integer of 1 or more;

$X_2$ is a moiety selected from the group consisting of (i) a residue obtained by removing $n_2$ hydroxyl group or groups from a compound containing at least $n_2$ alcoholic hydroxyl groups, (ii) a group of the formula $-Y_2-(-O-R_2)_2$ or $Y_2-O-R_2$, and (iii) a group of the formula II-A:

$$-\left(R_2'-Y_2-O-\right)_{m_2} R_2'-O-Y_2-O-R_2 \quad (II)\text{-A}$$
$$\phantom{-\left(R_2'-Y_2\right.}\Big| \phantom{\Big)_{m_2} R_2'-O-Y_2-}\Big|$$
$$\phantom{-\left(R_2'-Y_2\right.}O-R_2 \phantom{\Big)_{m_2} R_2'-O-Y_2-O}O-R_2$$

wherein $m_2$ is an integer of zero or more, $R_2'$ is a residue obtained by removing two OH groups from a polyhydric alcohol or hydroxycarboxylic acid;

$Y_2$ is a group selected from the group consisting of $\geqslant B-O-R_2)^-.Q_2^+$ and $\geqslant B-$, the $Q_2^+$ being a quaternary ammonium ion, with the proviso that at least one of the $Y_2$ groups in the general formula II is $\geqslant B-O-R_2)^-.Q_2^+$; and $R_2$s are independently hydrogen; alkyl; aralkyl; a residue of a hydroxycarboxylic acid compound of the formula $$\begin{array}{c} O \\ \| \\ -C-A, \end{array}$$

wherein A is alkyl or aralkyl having at least one hydroxyl group and optionally having at least one carboxyl group, or derivatives thereof; said derivatives of alkyl, aralkyl and $$\begin{array}{c} O \\ \| \\ -C-A \end{array}$$

containing at least one selected from the group consisting of hydroxy groups, ether linkages, ketone groups, N-containing groups and S-containing groups.

As the hydroxycarboxylic acid constituting the groups $R_2$ and $X_2$ in the general formula II, the following hydroxycarboxylic acids such as aliphatic hydroxycarboxylic acids, alicyclic hydroxycarboxylic acids and heterocyclic hydroxycarboxylic acids can be used. Examples of aliphatic hydroxycarboxylic acids include monocarboxylic acids such as hydroxyacetic acid, glyceric acid, lactic acid, hydroxybutanoic acid, 3-hydroxyphenylbutanoic acid, 2-hydroxy-2-methylbutanoic acid, 2-hydroxy-2-ethylbutanoic acid, 2-hydroxyisobutanoic acid, 2-hydroxyvaleric acid, hydroxypivalic acid, 2,2-bis(hydroxymethyl)propionic acid, hydroxyisocaproic acid, 10-hydroxydecanoic acid, 12-hydroxydodecanoic acid, 12-hydroxystearic acid, mandelic acid, 2-, 3- or 4-hydroxyphenylacetic acid, 4-amino-3-hydroxybutanoic acid, and gluconic acid; and polycarboxylic acids such as hydroxymalonic acid, hydroxysuccinic acid, dihydroxymalonic acid, 2-hydroxy-2-methylsuccinic acid, tartaric acid, mucic acid, citric acid, 3-hydroxy-3,4-dicarboxypentadecanoic acid and 2-hydroxy-1,2,3-nonadecanetricarboxylic acid. Examples of alicyclic hydroxycarboxylic acids include 1-hydroxy-1-cyclopropanecarboxylic acid and hexahydromandelic acid. Examples of heterocyclic hydroxycarboxylic acids include 2,6-hydroxyisonicotinic acid.

In formula II, $n_2$ is generally 1 or more, preferably 1 to 8, more preferably 1 to 3; $m_2$ is generally zero or more, preferably 0 to 10, and more preferably 0 to 5.

As the aforesaid quaternary salt of a boric acid complex with a hydroxycarboxylic acid, the use of a compound such that two $R_2$ groups or an $R_2$ and an $X_2$ group are joined together through a $-O-B-O-$ group to form a ring structure containing boron is also appropriate.

This type of compound is represented, for example, by the following formulae:

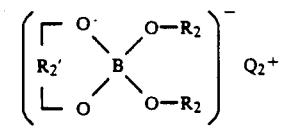

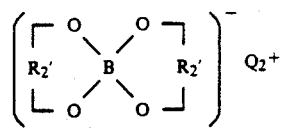

wherein $R_2$, $R_2'$ and $Q_2^+$ are as defined in formula II.

The quaternary ammonium salt of a boric acid complex with phosphoric acid and/or phosphoric acid ester, which is used in the present invention, is represented by the general formula III:

$$\left[ \begin{array}{c} R_3-O \\ \phantom{R_3-O}\diagdown \\ \phantom{RR}Y_3-O- \\ \phantom{R_3-O}\diagup \\ R_3-O \end{array} \right]_{n_3} X_3 \quad (III)$$

wherein $n_3$ is an integer of 1 or more;

$X_3$ is a moiety selected from the group consisting of (i) a residue obtained by removing $n_3$ hydroxyl groups from phosphoric acid and/or phosphate, (ii) a group of the formula $Y_3-O-R_3$, and (iii) a group of the formula III-A:

$$-\left(R_3'-Y_3-O-\right)_{m_3} R_3'-O-Y_3-O-R_3 \quad (III)\text{-A}$$
$$\phantom{-\left(R_3'-Y_3\right.}\Big| \phantom{\Big)_{m_3} R_3'-O-Y_3-}\Big|$$
$$\phantom{-\left(R_3'-Y_3\right.}O-R_3 \phantom{\Big)_{m_3} R_3'-O-Y_3-O}O-R_3$$

wherein $m_3$ is an integer of zero or more, $R_3'$ is a residue obtained by removing two hydroxyl groups from phosphoric acid or ester thereof containing at least two alcoholic hydroxyl groups;

$Y_3$ is a group selected from the group consisting of $\geqslant B-O-R_3)^-.Q_3^+$ and $\geqslant B-$, the $Q_3^+$ being a quaternary ammonium ion, with the proviso that in the group at least one of the $Y_3$ groups in the general formula III is $\geqslant B-O-R_3)^-.Q_3^+$; and $R_3$s are independently hydrogen, a residue of phosphoric acid or ester thereof shown by the formula III-B:

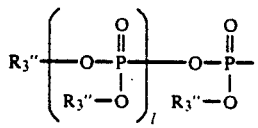

wherein l is 0 or 1; $R_3''$'s are independently hydrogen, alkyl, aralkyl or derivatives thereof, said derivatives of alkyl and aralkyl containing at least one selected from the group consisting of hydroxy groups, ether linkages, and S-containing groups.

As the phosphoric acid esters constituting the groups $R_3$ and $X_3$ in formula III, phosphates formed by phosphorylation reactions of hydroxyl compounds and phosphoric acids (i.e., orthophosphoric acid, pyrophosphoric acid, etc.) are listed. Examples of the hydroxyl compounds are linear or branched, saturated or unsaturated aliphatic primary alcohols such as methanol, ethanol, isopropanol, n-butanol, sec-butanol, tert-butanol, 2-ethylhexanol, allyl alcohol and propargyl alcohol, as well as benzyl alcohol; saturated or unsaturated alicyclic primary alcohols such as cyclohexanol, methylcyclohexanol, borneol and terpineol; primary alcohols with a molecular weight of 76 to 10,000 containing at least one ether group including polyalkylene glycol monoalkyl ether and polyoxyalkylenemono-ol disclosed in the specification of U.S. Pat. No. 4,116,846 such as Methyl cellosolve ®, Ethyl cellosolve ®, Butyl cellosolve ®, Methyl carbitol ®, Ethyl carbitol ® and Butyl carbitol ®; primary alcohols containing at least one hetero atom such as furfuryl alcohol, tetrahydrofurfuryl alcohol, thiophenmethanol, 2-mercaptoethanol, 4-hydroxy-2-butanone, hydroxyacetone and methylolacrylamide; saturated or unsaturated aliphatic polyols such as ethylene glycol, propylene glycol, ethylethylene glycol, 2,3-butanediol, pinacol, 1,2-hexanediol, 1,2-decanediol, 1,2-dodecanediol, glycerol, 1,2,4-trihydroxybutane, 1,2,3-heptatriol, 1,2,6-trihydroxyhexane, 1,2,3,4-tetrahydroxybutane, 1,2,7,8-tetrahydroxyoctane, 5-hexene-1,2-diol and 7-octen-1,2-diol, ditrimethylene glycol, 1,3-butanediol, 1,4-butanediol, 2,4-pentanediol, 1,5-pentanediol, neopentyl glycol, 1,6-hexanediol, 2,5-hexanediol, 2-methyl-1,3-pentanediol, hexylene glycol, 2,2-dimethylolbutane, 2,4-heptanediol, 2-ethyl-1,3-hexanediol, 2-ethyl-2-n-butyl-1,3-propanediol, cis-2-butene-1,4-diol, trans-2-butene-1,4-diol, 2-butyne-1,4-diol, dimethylhexynediol, and trimethylolpropane; alicyclic polyols such as 1,2-cyclopentanediol, 1,2-cyclohexanediol, 1,2-cycloheptanediol, inositol, and 3,5-cyclohexadiene-1,2-diol, 1,4-cyclohexanediol, cyclohexane-1,3,5-triol and 4-cyclohexene-1,3-diol; suger alcohols such as erythritol, ribitol, xylitol, sorbitol mannitol, dulcitol and pentaerythritol; polyols containing at least one ether groups such as 3-methoxy-1,2-propanediol, 3-ethoxy-1,2-propanediol, 3-propoxy-1,2-propanediol, 3-butoxy-1,2-propanediol, 3-phenylmethoxy-1,2-propanediol, 3-benzyloxy-1,2-propanediol, diglycerol, triglycerol, polyols having a molecular weight of 120 to 10,000 including diethylene glycol, triethylene glycol, tetraethylene glycol, dipropylene glycol, tripropylene glycol, tetrapropylene glycol, polyethylene glycol, polypropylene glycol, polybutylene glycol, copolymer of ethylene glycol, propylene glycol or butylene glycol, and polyoxyalkylenepolyol disclosed in U.S. Pat. No. 4,116,846. Furthermore, sulfur-containing polyols such as thiodiethylene glycol and 2,2'-(decamethylenedithio)dimethanol; polymers containing alcoholic hydroxyl groups such as polyhydroxyethyl (meth)acrylate having a molecular weight of 234 to 45,000, polyvinylalcohol having a molecular weight of 90 to 45,000 and vinylalcohol-hydroxyethyl (meth)acrylate copolymer having a molecular weight of 162 to 45,000; and compounds containing one or more phenolic hydroxyl groups such as phenol, catechol, resorcinol, hydroquinone, phloroglucinol, pyrogallol, 1,2,4-trihydroxybenzene, cresol, naphtaol, nitrophenol, dinitrophenol, picric acid, nitrocatechol, nitroresorcinol and trinitroresorcinol can also be used.

Either one type of these hydroxyl compounds or a combination of two or more types of the compounds can be used.

In formula III, the value of $n_3$ is ordinarily at least 1, preferably 1–8, and more preferably 1–3, while the value of $m_3$ is ordinarily zero or more, preferably 0–10 and more preferably 0–5.

As the aforesaid quaternary ammonium salt of the boric acid complex with phosphoric acid and/or a phosphoric acid ester, the use of a compound such that two $R_3$ groups or an $R_3$ group and an $X_3$ group are joined together through a —O—B—O— group to form a ring structure containing boron is also appropriate.

This type of compound is represented, for example, by the following formulae.

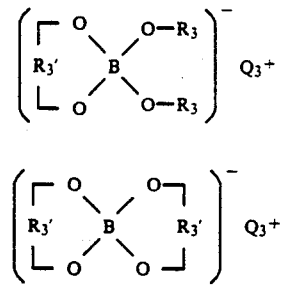

wherein $R_3$, $R_3'$ and $Q_3^+$ are defined in formula III. Within the group $R_3$ of the formula III, the group $R_3''$ is, desirably, either a hydrogen or alkyl with 1 to 10 carbon atoms, alkyl with 1 to 4 carbon atoms being particularly desirable.

The quaternary ammonium salt of a boric acid complex with monocarboxylic compound used in the present invention is represented by the general formula IV:

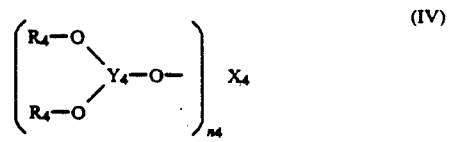

wherein $n_4$ in an integer or 1 or more;

$X_4$ is a moiety selected from the group consisting of (i) a residue of a monocarboxylic acid compound of the formula

wherein A is hydrogen, alkyl or aryl, and (ii) a group of the formula $-Y_4-(-O-R_4)_2$ or $>Y_4-O-R_4$;

$Y_4$ is a group selected from the group consisting of (iii) a group of the formula $\geqslant B-O-R_4)^- Q_4^+$ and (iv) $\geq B-$, $Q_4^+$ being a quaternary ammonium ion with the proviso that at least one of the $Y_4$ groups in formula IV is $\geqslant B-O-R_4)^-.Q_4^+$, $R_4$ is selected from the group consisting of (v) hydrogen and (vi) a residue of an monocarboxylic acid compound of the formula $$-\overset{O}{\underset{\|}{C}}-A,$$

wherein A is hydrogen, alkyl, aryl or derivatives thereof, said derivatives of alkyl and aryl containing at least one amino groups.

Examples of the monocarboxylic acid constituting the compound of formula IV are linear or branched, saturated on unsaturated monocarboxylic acid such as formic acid, acetic acid, propionic acid, butyric acid, valeric acid, caproic acid, enanthic acid, caprylic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachidic acid, isobutanoic acid, isovaleric acid, isocaproic acid, ethylbutanoic acid, methylvaleric acid, isocaprylic acid, propylvaleric acid, ethylcaproic acid, isocapric acid, pivalic acid, 2,2-dimethylbutanoic acid, 2,2-dimethylpentanoic acid, 2,2-dimethylhexanoic acid, 2,2-dimethylheptanoic acid, 2-methyl-2-ethylbutanoic acid, 2-methyl-2-ethylpentanoic acid, 2-methyl-2-ethylhexanoic acid, 2-methyl-2-ethylheptanoic acid, 2-methyl-2-propylpentanoic acid, 2-methyl-2-propylhexanoic acid, acrylic acid, crotonic acid, isocrotonic acid, 3-butenoic acid, pentenoic acid, hexenoic acid, heptenoic acid, octenoic acid, nonenoic acid, decenoic acid, undecenoic acid, dodecenoic acid, 4-tetradecenoic acid, palmitoleic acid, petroselinic acid, oleic acid, elaidic acid, vaccenic acid, gadoleic acid, acrylic acid, methacrylic acid, 3-methylcrotonic acid, tiglic acid, methylpentenoic acid, cyclopentanecarboxylic acid, and cyclohexanecarboxylic acid; and aromatic monocarboxylic acid (including o-, m- and p-isomers) such as benzoic acid, toluic acid, ethylbenzoic acid, propylbenzoic acid, isopropylbenzoic acid, butylbenzoic acid, isobutylbenzoic acid, sec-butylbenzoic acid, tertbutylbenzoic acid, ethoxybenzoic acid, propoxybenzoic acid, isopropoxybenzoic acid, butoxybenzoic acid, aminobenzoic acid, N-methylaminobenzoic acid, N-ethylaminobenzoic acid, N-propylaminobenzoic acid, N-isopropylaminobenzoic acid, N-butylaminobenzoic acid, N-isobutylaminobenzoic acid, N,N-dimethylaminobenzoic acid, N,N-diethylaminobenzoic acid and nitrobenzoic acid; amino acid containing a carboxyl group such as glycine, alanine, valine, leucine, phenylglycine and phenylalanine.

In formula IV, the value of $n_4$ is ordinarily at least 1, preferably 1-8, and more preferably 1-3.

As the aforesaid quaternary ammonium salt of a boric acid complex with a monocarboxylic acid, the use of a compound such that two $R_4$ groups or an $R_4$ group and an $X_4$ group are joined together through a $-O-B-O-$ group to form a ring structure containing boron is also appropriate.

This type of compound is represented, for example, by the following formulae.

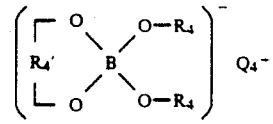

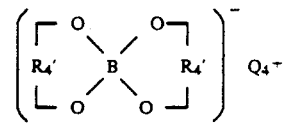

Examples of quaternary ammonium ions constituting the quaternary ammonium salts represented by Formulae I to IV include tetraalkylammonium ion (containing 1 to 12 carbon atoms, independently in the alkyl groups) such as tetramethylammonium, tetraethylammonium, tetrapropylammonium, tetrabutylammonium, methyltriethylammonium, dimethyldiethylammonium and ethyltrimethylammonium; aryltrialkylammonium such as phenyltrimethylammonium; cyclohexyltrialkylammonium such as cyclohexyltrimethylammonium; and arylalkyltrialkylammonium such as benzyltrimethylammonium. Pyrrolidinium ions and piperidinium ions can also be used. Examples of these ions include N,N-dimethylpyrrolidinium, N,N-dimethylpiperidinium and N,N-pentamethylpiperidinium.

Asymmetric tetra-alkylammonium ions such that at least one of the alkyl groups is different from the other alkyl groups are especially desirable. Applicable asymmetric tetra-alkylammonium ions include methyltriethylammonium, dimethyldiethylammonium and ethyltrimethylammonium ions.

The aforesaid quaternary ammonium salt of the boric acid complex with an alcoholic-hydroxy containing compound can be synthesized by, for example, allowing a mixture of a quaternary ammonium salt of boric acid and an alcoholic-hydroxy containing compound to react and removing the water which is formed as a by-product. Alternative methods of synthesis include a method disclosed in U.K. Patent No. 1,323,312 and U.S. Pat. No. 4,192,759 as well as that disclosed in "Methods of Elemento Organic Chemistry," Volume 1 (A. N. Nesmeyanov and K. A. Kocheshkov, 1967), pp. 311-356. In this method, a complex formed by boric acid and an alcoholic-hydroxy containing compound with a quaternary ammonium hydroxide are mixed and the water which is generated as a by-product is removed, resulting in a desired product. In place of the boric acid complex, a metallic salt of the complex can be used and the metallic ion is substituted by the quaternary ammonium ion, removing the metallic compound which is generated as a by-product. The molar ratio of boric acid and the alcoholic-hydroxy containing compound is ordinarily 0.2-10 moles, more preferably, 0.5-5 moles of the alcoholic-hydroxy containing compound to 1 mole of boric acid. The molar ratio of boric acid and the quaternary ammonium hydroxide is ordinarily 0.5-1.5 moles, preferably, 0.8-1.2 moles of boric acid to 1 mole of the quaternary ammonium. The presence of an excess of quaternary ammonium compound, for example, a quaternary ammonium hydroxide or a quaternary ammonium alkoxide, or a salt of another acid, is also permissible.

Quaternary ammonium salts of other complexes used in the present invention can be synthesized by similar methods. Also, in quaternary ammonium salts of mixtures of boric acid complexes with alcoholic-hydroxy containing compounds and boric acid complexes with alcoholic-hydroxy containing hydroxycarboxylic acids, the molar ratio of alcoholic-hydroxy containing compound and hydroxycarboxylic acid should ordinarily be 0.1–10 moles, preferably 0.2–4 moles of hydroxycarboxylic acid to 1 mole of the alcoholic-hydroxyl containing compound. In the above-mentioned mixture of quaternary ammonium salts, a quaternary ammonium salt of a complex formed by intermolecule exchange of ligands can also be present in addition to the quaterrary ammonium salt of a boric acid complex with alcoholic-hydroxy containing compound and a boric acid complex with alcoholic-hydroxy containing oxdycarboxylic acid.

The electrolytes of the present invention contain the above-mentioned quaternary ammonium salt and a solvent (ordinarily, an organic solvent).

Examples of organic solvents include alcohols such as methyl alcohol, ethyl alcohol, propyl alcohol, butyl alcohol, diacetone alcohol, benzyl alcohol, amino alcohol, ethylene glycol, propylene glycol, diethylene glycol, hexylene glycol, glycerol and hexitols; ethers such as ethylene glycol monomethyl ether, ethylene glycol monoethyl ether, diethylene glycol monomethyl ether, diethylene glycol monoethyl ether, ethylene glycol phenyl ether, ethylene glycol dimethyl ether, ethylene glycol diethyl ether, diethylene glycol dimethyl ether and diethylene glycol diethyl ether; amides such as N-methylformamide, N,N-diethylformamide, N-ethylformamide, N,N-diethylformamide N-methylacetamide, N,N-dimethylacetamide, N-ethylacetamide, N,N-diethylacetamide, N,N-dimethylpropionamide and hexamethylphosphorylamide; oxazolidinones such as N-methyl-2-oxazolidinone and 3,5-dimethyl-2-oxazolidinone; lactones such as $\gamma$-butyrolactone, $\alpha$-acetyl-$\gamma$-butyrolactone, $\beta$-butyrolactone, $\gamma$-valerolactone and $\delta$-valerolactone; nitriles such as acetonitrile and acrylonitrile; dimethyl sulfoxide; sulfolane; 1,3-dimethyl-2-imidazolidinone; N-methylpyrrolidone; aromatic solvents such as xylene and toluene; paraffinic solvents such as n-paraffin and isoparaffin; and a mixture of at least two of these solvents. It is suitable to use a solvent comprising essentially $\gamma$-butyrolactone.

Water may, when necessary, be included in the constituents of the electrolytes of the present invention to the extent that the complex (for example, a boric acid complex with an alcoholic-hydroxy containing compound) contained in the electrolytes is not hydrolyzed and transformed into simple boric acid. The permissible water content should ordinarily not exceed 5% by weight, preferably 3% by weight, or still more preferably 1% by weight of the entire electrolytic solution.

The proportion of quaternary ammonium salt in the electrolytes of the present invention should ordinarily be 1–70% by weight, preferably 10–40% by weight, based on the total weight of the entire electrolytic solution.

Various types of additives can be added to the electrolytes of the present invention for purposes such as the reduction of current leakage, absorption of hydrogen gas, etc. The additives include derivatives of phosphoric acid, derivatives of boric acid and nitro compounds.

Using the aforesaid electrolytes, the capacitors of the present invention can be produced, for example, as follows. An aluminum anode foil 1, separator 3 made of paper or porous plastic film, an aluminum cathode foil 2 and another separator 3 are successively laminated in this order and wound as shown in FIG. 1. The anode foil 1 and cathode foil 2 are then connected to the respective leads 4 to form the capacitor element. The aforesaid capacitor element are then impregnated with the aforesaid electrolyte, and the finished capacitor is obtained by sealing this element into a case of aluminum or other suitable material.

The solutes appropriate for use in the electrolytes for electrolytic capacitors of the present invention include quaternary ammonium salts of a boric acid complex with an alcoholic-hydroxy containing compound; a mixture of quaternary ammonium salt of a boric acid complex with an alcoholic-hydroxy containing compound and quaternary ammonium salt of a boric acid complex with a hydroxycarboxylic acid; quaternary ammonium salts of a boric acid complex with phosphoric acid and/or a phosphoric acid ester; or quaternary ammonium salts of a boric acid complex with monocarboxylic acids. Owing to the use of these solutes, in all applicable voltage classes, including low, intermediate and high voltage, the electrolytes of the present invention display higher specific conductivity and higher sparking voltages then conventional types of electrolytes.

Consequently, the electrolytes of the present invention permit the manufacture of long-life electrolytic capacitors with low dielectric losses and stable electrical characteristics at high temperatures. This type of capacitor is suitable for a wide range of applications in various industrial uses.

In the following, the present invention will be described in greater detail with reference to specific examples, however, these examples are illustrative, and the scope of the present invention is not confined to these specific examples. In the following examples, unless otherwise indicated, parts and percentages are based on weight.

EXAMPLE 1

First, 20 parts of a boric acid salt of methyltriethylammonium hydroxide (prepared using 1.03 mole equivalents of boric acid with respect to methyltriethylammonium) were mixed with 19 parts of formic acid (4.0 mole equivalents with respect to boric acid), and a reaction was conducted at 60° C. under a reduced pressure of 7 mmHg. Removal of by-product water was continued for 5 hours, thereby obtaining 29 parts of a methyltriethylammonium salt of boric-formic acid complex. An electrolyte was then obtained by dissolving 20% by weight of this methyltriethylammonium salt of boric-formic acid complex in $\gamma$-butyrolactone as a solvent.

EXAMPLE 2

A quaternary ammonium salt was obtained by a method similar to that in Example 1, and an electrolyte with the composition shown in Table 1-1 was prepared.

COMPARATIVE EXAMPLE 1

An electrolyte was obtained by dissolving 20% by weight of triethyamine salt of phthalic acid in $\gamma$-butyrolactone as a solvent as shown in Table 1-4.

EXAMPLE 3

A quaternary ammonium salt was obtained by a method similar to that in Example 1, except that 2.4 mole equivalents of ethylene glycol with respect to boric acid were used, and an electrolyte with the composition shown in Table 1-1 was prepared.

EXAMPLES 4–9, AND COMPARATIVE EXAMPLE 2

Quaternary ammonium salts were obtained by methods similar to that in Example 3, and electrolytes with the compositions shown in Tables 1-1, 1-2 and 1-4 were prepared.

EXAMPLE 10

A quaternary ammonium salt was obtained by a method similar to that in Example 1, except that 1.2 mole equivalents of an adduct prepared from 1.0 mole of diglycerin and 2.0 moles of propyleneoxide were used with respect to boric acid, and an electrolyte with the composition shown in Table 1-2 was prepared.

EXAMPLE 11

First, 10 parts of a boric acid salt of methyltriethylammonium hydroxide (prepared using 1.03 mole equivalents of boric acid with respect to methyltriethylammonium) were mixed with 6.9 parts of dimethyl phosphate (1.0 mole equivalents with respect to boric acid) and 6.1 parts of monomethyl phosphate (1.0 mole equivalents with respect to boric acid), and a reaction was conducted at 60° C. under a reduced pressure of 7 mmHg. Removal of by-product water was continued for 5 hours, thereby obtaining 19 parts of a mixture of a methyltriethylammonium salt of a boric acid-dimethyl phosphate complex and a methyltriethylammonium salt of a boric acid-monomethyl phosphate complex. An electrolyte was then obtained by dissolving 20% by weight of the said mixture of the methyltriethylammonium salt of a boric acid-dimethyl phosphate complex and the methyltriethylammonium salt of a boric acid-monomethyl phosphate complex in γ-butyrolactone as a solvent.

EXAMPLES 12 AND 13

Quaternary ammonium salts were obtained by methods similar to that in Example 1, and electrolytes with the compositions shown in Table 1-2 were prepared.

EXAMPLE 14

A quaternary ammonium salt was obtained by a method similar to that in Example 1, except that 2 mole equivalents of di(n-butyl) phosphate with respect to boric acid were used, and an electrolyte with the composition shown in Table 1-2 was prepared.

EXAMPLES 15 AND 16, AND COMPARATIVE EXAMPLE 3

Quaternary ammonium salts were obtained by methods similar to that in Example 14, and electrolytes with the compositions shown in Tables 1-2 and 1-4 prepared.

EXAMPLE 17

First, 20 parts of a boric acid salt of methyltriethylammonium hydroxide (prepared using 1.03 mole equivalents of boric acid with respect to methyltriethylammonium) were mixed with 23.6 parts of 1,4-butanediol (2.4 mole equivalents with respect to boric acid), and a reaction was conducted at 60° C. under a reduced pressure of 7 mmHg. Removal of by-product water was continued for 5 hours, thereby obtaining 35.3 parts of a methyltriethylammonium salt of a boric acid-1,4-butanediol complex. Also, 20 parts of a boric acid salt of methyltriethylammonium hydroxide (prepared using 1.03 mole equivalents of boric acid with respect to methyltriethylammonium) were mixed with 19.7 parts of lactic acid (2 mole equivalents with respect to boric acid), a reaction was conducted at 60° C. under a reduced pressure of 7 mmHg, and by-product water was removed over a period of 5 hours, thereby obtaining 31 parts of a methyltriethylammonium salt of a boriclactic acid complex. Next, 10 parts of the methyltriethylammonium salt of a boric acid complex with 1,4-butanediol complex and 10 parts of the methyltriethylammonium salt of a boric-lactic acid complex were dissolved in 80 parts of γ-butyrolactone as a solvent, then the solution was subjected to heat treatment for 2 hours at 80° C. under a nitrogen gas current to obtain an electrolyte.

EXAMPLES 18 AND 21

Quaternary ammonium salts were obtained by methods similar to those in Example 17, and electrolytes with the compositions shown in Table 1-3 were prepared.

EXAMPLE 19

A quaternary ammonium salt was obtained by a method similar to that in Example 17, except that 1.2 mole equivalents of an adduct prepared from 1.0 mole of diglycerin and 2.0 moles of propyleneoxide were used with respect to boric acid, and an electrolyte with the composition shown in Table 1-3 was prepared.

EXAMPLES 20 AND 22

Quaternary ammonium salts were obtained by methods similar to those in Example 19, and electrolytes with the compositions shown in Table 1-3 were prepared.

COMPARATIVE EXAMPLES 4–5

Electrolytes were prepared by the use of the solutes and solvents shown in Table 1-4.

The compositions of the electrolytes of Examples 1–8 are shown in Table 1-1, those of Examples 9–16 in Table 1-2, those of Examples 17–22 in Table 1-3 and those of Comparative Examples 1–6 in Table 1-4, respectively.

By the use of the electrolytes obtained in the aforesaid examples and comparative examples, the following measurements were carried out, respectively.

Table 2 shows the sparking voltage, the specific conductivity at +30° C. and the water content of the electrolytes for low voltage electrolytic capacitors obtained in Examples of the present invention as well as the corresponding properties for comparative examples, and in addition the loss tangent (referred to below as tan δ) and current leakage (referred to below as LC), measured in high-temperature unloaded tests (125° C., 1000 hours), of electrolytic capacitors (100 V, 470 μF) employing these electrolytes.

Tables 3-1 and 3-2 show the sparking voltage, the specific conductivity at +30° C. and the water content of the electrolytes for intermediate voltage electrolytic capacitors obtained in examples of the present invention as well as the corresponding properties for comparative examples, and in addition the values of tan δ and LC measured in high-temperature unloaded tests (125° C., 1000 hours), of electrolytic capacitors (200 V, 100 μF) employing these electrolytes.

Table 4 shows the sparking voltage, the specific conductivity at +30° C. and the water content of the electrolytes for high voltage electrolytic capacitors obtained in examples of the present invention as well as the corresponding properties for comparative examples, and in addition the initial values of tan δ at +30° C. and −25° C. as well as the values of tan δ at 30° C. measured after high-temperature unloaded tests (125° C., 1000 hours), of electrolytic capacitors (400 V, 270 μF) employing these electrolytes.

The listed values of the electrical characteristics (tan δ and LC) of the aforesaid electrolytic capacitors are mean values of 10 measurements.

TABLE 1-1

| Example | Composition of electrolyte | % by weight |
|---|---|---|
| 1 | MTEA[a] salt of boric acid complex with formic acid | 20 |
|   | γ-Butyrolactone | 80 |
| 2 | MTEA salt of boric acid complex with isovaleric acid | 20 |
|   | γ-Butyrolactone | 80 |
| 3 | MTEA salt of boric acid complex with ethylene glycol | 20 |
|   | γ-Butyrolactone | 80 |
| 4 | MTEA salt of boric acid complex with trimethylene glycol | 20 |
|   | γ-Butyrolactone | 80 |
| 5 | MTEA salt of boric acid complex with cis-2-butene-1,4 diol | 20 |
|   | γ-Butyrolactone | 80 |
| 6 | MTEA salt of boric acid complex with Ethyl cellosolve ® | 20 |
|   | γ-Butyrolactone | 80 |
| 7 | MTEA salt of boric acid complex with pinacol | 20 |
|   | γ-Butyrolactone | 80 |
| 8 | MTEA salt of boric acid complex with 1,2-hexanediol | 20 |
|   | γ-Butyrolactone | 80 |

[a]MTEA: methyltriethylammonium.

TABLE 1-2

| Example | Composition of electrolyte | % by weight |
|---|---|---|
| 9 | MTEA[a] salt of boric acid complex with 1,4-butanediol | 15 |
|   | γ-Butyrolactone | 85 |
| 10 | MTEA salt of boric acid complex with diglycerin-propyleneoxide adduct[b] | 15 |
|   | γ-Butyrolactone | 85 |
| 11 | MTEA salt of boric acid complex with methyl phosphate | 20 |
|   | γ-Butyrolactone | 80 |
| 12 | MTEA salt of boric acid complex with ethyl phosphate | 20 |
|   | γ-Butyrolactone | 80 |
| 13 | MTEA salt of boric acid complex with isopropyl phosphate | 20 |
|   | γ-Butyrolactone | 80 |
| 14 | MTEA salt of boric acid complex with di-n-butyl phosphate | 20 |
|   | γ-Butyrolactone | 80 |
| 15 | MTEA salt of boric acid complex with n-butyl phosphate | 20 |
|   | γ-Butyrolactone | 80 |
| 16 | MTEA salt of boric acid complex with phosphoric acid | 20 |
|   | γ-Butyrolactone | 80 |

[a]MTEA: methyltriethylammonium.
[b]The adduct is prepared from 1.0 mole of diglycerin and 2.0 moles of propyleneoxide.

TABLE 1-3

| Example | Composition of electrolyte | % by weight |
|---|---|---|
| 17 | MTEA[a] salt of boric acid complex with 1,4-butanediol | 10 |
|   | MTEA salt of boric acid complex with lactic acid | 10 |
|   | γ-Butyrolactone | 80 |
| 18 | MTEA salt of boric acid complex with 1,4-butanediol | 10 |
|   | MTEA salt of boric acid complex with hydroxypivalic acid | 10 |
|   | γ-Butyrolactone | 80 |
| 19 | MTEA salt of boric acid complex with diglycerin-propyleneoxide adduct[b] | 10 |
|   | MTEA salt of boric acid complex with glycolic acid | 10 |
|   | γ-Butyrolactone | 80 |
| 20 | MTEA salt of boric acid complex with diglycerin-propyleneoxide adduct | 10 |
|   | MTEA salt of boric acid complex with glyceric acid | 10 |
|   | γ-Butyrolactone | 80 |
| 21 | MTEA salt of boric acid complex with 1,4-butanediol | 10 |
|   | MTEA salt of boric acid complex with glyconic acid | 10 |
|   | γ-Butyrolactone | 80 |
| 22 | MTEA salt of boric acid complex with diglycerin-propyleneoxide adduct[b] | 10 |
|   | MTEA salt of boric acid complex with tartaric acid | 10 |
|   | γ-Butyrolactone | 80 |

[a]MTEA: methyltriethylammonium.
[b]The adduct is prepared from 1.0 mole of diglycerin and 2.0 moles of propyleneoxide.

TABLE 1-4

| Comparative Example | Composition of electrolyte | % by weight |
|---|---|---|
| 1 | Triethylamine salt of phthalic acid | 20 |
|   | γ-Butyrolactone | 80 |
| 2 | TMA[b] salt of boric acid complex with catechol | 20 |

TABLE 1-4-continued

| Comparative Example | Composition of electrolyte | % by weight |
|---|---|---|
| | γ-Butyrolactone | 80 |
| 3 | TEM[a] salt of boric acid complex with oxalic acid | 20 |
| | γ-Butyrolactone | 80 |
| 4 | TEA salt of boric acid | 10 |
| | γ-Butyrolactone | 90 |
| 5 | TEA salt of boric acid | 10 |
| | Ethylene glycol | 90 |
| 6 | Ammonium salt of 1,6-decane dicarboxylic acid | 10 |
| | Ethylene glycol | 90 |

[a]TEA: tetraethylammonium
[b]TMA: tetramethylammonium

TABLE 2

| | Sparking voltage (V) | Specific conductivity at 30° C. (mS/cm) | Water content (%) | Initial value tan δ (%) | Initial value LC (μA) | After 1000 hours at 125° C. tan δ (%) | After 1000 hours at 125° C. LC (μA) |
|---|---|---|---|---|---|---|---|
| Example | | | | | | | |
| 1 | 174 | 13.6 | 0.4 | 2.0 | 16.2 | 2.3 | 56.4 |
| 2 | 220 | 6.2 | 0.5 | 2.6 | 14.1 | 2.7 | 53.1 |
| Comparative Example | | | | | | | |
| 1 | 80 | 3.8 | 1.0 | | | —[a] | |
| 3 | 30 | 9.6 | 1.2 | | | —[a] | |

[a]Sparking voltage was low, so that the electrolyte could not be used for capacitors with rated voltage of 100 V.

TABLE 3-1

| Example | Sparking voltage (V) | Specific conductivity at 30° C. (mS/cm) | Water content (%) | Initial value tan δ (%) | Initial value LC (μA) | After 1000 hours at 125° C. tan δ (%) | After 1000 hours at 125° C. LC (μA) |
|---|---|---|---|---|---|---|---|
| 3 | 312 | 5.4 | 1.0 | 3.2 | 9.0 | 3.3 | 31.4 |
| 4 | 375 | 4.5 | 0.8 | 3.7 | 13.0 | 3.9 | 41.0 |
| 5 | 340 | 4.6 | 0.7 | 3.6 | 11.2 | 3.7 | 37.5 |
| 6 | 295 | 4.4 | 1.1 | 3.8 | 15.3 | 4.3 | 50.4 |
| 7 | 320 | 5.1 | 0.8 | 3.4 | 15.7 | 3.7 | 51.2 |
| 8 | 358 | 3.9 | 0.6 | 4.1 | 14.0 | 4.3 | 36.1 |
| 11 | 365 | 5.2 | 0.8 | 3.2 | 9.0 | 3.3 | 31.4 |
| 12 | 400 | 4.4 | 0.7 | 3.7 | 13.0 | 3.9 | 41.0 |
| 13 | 380 | 4.3 | 0.7 | 3.8 | 12.5 | 4.0 | 36.2 |
| 14 | 420 | 3.9 | 0.5 | 4.1 | 14.0 | 4.3 | 36.1 |

TABLE 3-2

| | Sparking voltage (V) | Specific conductivity at 30° C. (mS/cm) | Water content (%) | Initial value tan δ (%) | Initial value LC (μA) | After 1000 hours at 125° C. tan δ (%) | After 1000 hours at 125° C. LC (μA) |
|---|---|---|---|---|---|---|---|
| Example | | | | | | | |
| 17 | 380 | 5.7 | 0.8 | 3.2 | 9.0 | 3.3 | 31.4 |
| 18 | 400 | 4.5 | 0.7 | 3.7 | 13.0 | 3.9 | 41.0 |
| 19 | 385 | 5.4 | 0.4 | 3.3 | 8.5 | 3.4 | 30.3 |
| 20 | 405 | 4.2 | 0.5 | 3.8 | 14.0 | 4.3 | 36.1 |
| Comparative Example | | | | | | | |
| 2 | 40 | 5.5 | 0.3 | | | —[a] | |
| 4 | —[b] | — | — | — | — | — | — |
| 5 | 280 | 2.3 | 5.4 | 4.9 | 24.4 | —[c] | —[c] |

[a]Sparking voltage was low, so that the electrolyte could not be used for capacitors with rated voltage of 200 V.
[b]Solute was precipitated.
[c]Safety valve was operated.

TABLE 4

| | Sparking voltage (V) | Specific conductivity at 30° C. (mS/cm) | Water content (%) | Initial value tan δ (%) (30° C.) | Initial value tan δ (%) (−25° C.) | After 1000 hours at 125° C. tan δ (%) (30° C.) |
|---|---|---|---|---|---|---|
| Example | | | | | | |
| 9 | 420 | 3.2 | 0.8 | 2.8 | 32.2 | 2.9 |

TABLE 4-continued

| | Sparking voltage (V) | Specific conductivity at 30° C. (mS/cm) | Water content (%) | Initial value tan δ (%) (30° C.) | Initial value tan δ (%) (−25° C.) | After 1000 hours at 125° C. tan δ (%) (30° C.) |
|---|---|---|---|---|---|---|
| 10 | 465 | 2.2 | 0.9 | 3.7 | 44.3 | 4.0 |
| 15 | 430 | 3.2 | 0.8 | 2.8 | 32.2 | 2.9 |
| 16 | 470 | 2.2 | 0.9 | 3.8 | 44.0 | 4.2 |
| 21 | 440 | 3.3 | 0.8 | 2.8 | 32.2 | 2.9 |
| 22 | 480 | 2.3 | 0.9 | 3.8 | 45.0 | 4.2 |
| Comparative Example 6 | 410 | 2.2 | 1.4 | 3.6 | 79.6 | 7.1 |

As is clearly demonstrated by the data in Tables 2–4, comparison of Examples 1–2 with Comparative Examples 1–2, comparison of Examples 3–8, 11–14 and 17–20 with Comparative Examples 3–5 and comparison of Examples 9–10, 15–16 and 21–22 with Comparative Example 6 all show that the capacitors of the present invention display higher sparking voltages as well as higher specific conductivities than those of the Comparative Examples.

Moreover, as is clearly shown by the data in Table 4, the values of tan δ at a low temperature (−25° C.) displayed by the listed electrolytic capacitors employing the electrolytes of the present invention are extremely low as compared with the corresponding low-temperature value of tan δ for the capacitor employing the electrolyte of Comparative Example 6, illustrating the superior electrical characteristics of the type of capacitor of the present invention.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An electrolyte for use in electrolytic capacitors, comprising as a solute at least one kind of quaternary ammonium salt of a boric acid complex with an alcoholic-hydroxy containing compound, said quaternary ammonium salt being of the formula I:

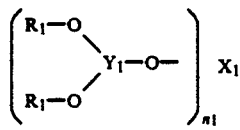

(I)

where $n_1$ is an integer of 1 or more;

$X_1$ is a moiety selected from the group consisting of (i) a residue obtained by removing $n_1$ hydroxyl group or groups from a compound containing at least $n_1$ alcoholic hydroxyl groups, (ii) a group of the formula $-Y_1-(O-R_1)_2$ or $Y_1-O-R_1$, and (iii) a group of the formula I-A:

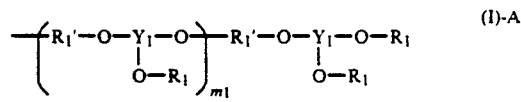

(I)-A wherein $m_1$ is an integer of zero or more, $R_1'$ is a residue obtained by removing two hydroxyl groups from a compound containing at least two alcoholic hydroxyl groups;

$Y_1$ is a group selected from the group consisting of $\geqslant B-O-R_1)^-.Q_1^+$ and $>B-$, the $Q_1^+$ being a quaternary ammonium ion, with the proviso that at least one of the $Y_1$ groups in the general formula I is $\geqslant B-O-R_1)^-.Q_1^+$;

$R_1$s are independently hydrogen, alkyl, aralkyl, or derivatives thereof, said derivatives of alkyl and aralkyl containing at least one selected from the group consisting of hydroxy groups, ether linkages, ketone groups and S-containing groups, and said two $R_1$ groups or an $R_1$ and $X_1$ group may be joined together through a $-O-B-O-$ group to form a ring structure containing boron; and said alcoholic-hydroxy containing compound being selected from the group consisting of:
(a) compounds possessing one alcoholic hydroxyl group;
(b) compounds having at least two vicinal alcoholic hydroxyl groups;
(c) saturated linear aliphatic compounds having two alcoholic hydroxyl groups, and having no vicinal alcoholic hydroxyl groups; (d) unsaturated aliphatic compounds having two alcoholic hydroxyl groups, and having no vicinal alcoholic hydroxyl groups;
(e) alicyclic compounds having two alcoholic hydroxyl groups, and having no vicinal alcoholic hydroxyl groups;
(f) ether-group containing compounds having two alcoholic hydroxyl groups, and having no vicinal alcoholic hydroxyl groups;
(g) sulfur-containing compounds having two alcoholic hydroxyl groups, and having no vicinal alcoholic hydroxyl groups;
(h) nitrogen-containing compounds having two alcoholic hydroxyl groups, and having no vicinal alcoholic hydroxyl groups;
(i) phosphorus-containing compounds having two alcoholic hydroxyl groups, and having no vicinal alcoholic hydroxyl groups; and
(j) compounds having more than two alcoholic hydroxyl groups, and having no vicinal alcoholic hydroxyl groups.

2. An electrolyte for use in electrolytic capacitors according to claim 1, wherein said quaternary ammonium ion is asymmetric.

3. An electrolytic capacitor comprising a capacitor element having an anode, a cathode and a separator disposed therebetween, wherein said capacitor element is impregnated with an electrolyte of claim 1.

4. An electrolyte for use in electrolytic capacitors, comprising as a solute a mixture of at least one kind of quaternary ammonium salt of a boric acid complex with an alcoholic-hydroxy containing compound, and at least one kind of quaternary ammonium salt of a boric acid complex with hydroxycarboxylic acid, said quaternary ammonium salts being of the formula II:

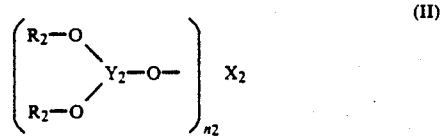

wherein $n_2$ is an integer of 1 or more;

$X_2$ is a moiety selected from the group consisting of (i) a residue obtained by removing $n_2$ hydroxyl group or groups from a compound containing at least $n_2$ alcoholic hydroxyl groups, (ii) a group of the formula $-Y_2-(-O-R_2)_2$ or $=Y_2-O-R_2$, and (iii) a group of the formula II-A:

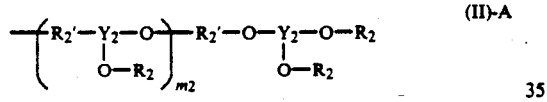

wherein $m_2$ is an integer of zero or more, $R_2'$ is a residue obtained by removing two OH groups from a polyhydric alcohol or hydroxycarboxylic acid;

$Y_2$ is a group selected from the group consisting of $>B-O-R_2)^-.Q_2^+$ and $=B-$, the $Q_2^+$ being a quaternary ammonium ion, with the proviso that at least one of the $Y_2$ groups in the general formula II is $>B-O-R_2)^-.Q_2^+$; and $R_2$s are independently hydrogen; alkyl; aralkyl; a residue of a hydroxycarboxylic acid compound of the formula

wherein A is alkyl or aralkyl having at least one hydroxyl group and optionally having at least one carboxyl group, or derivatives thereof; said derivatives of alkyl, aralkyl and

containing at least one selected from the group consisting of hydroxy groups, ether linkages, ketone groups, N-containing groups and S-containing groups, and said two $R_2$ groups or an $R_2$ and $X_2$ groups may be joined together through a $-O-B-O-$ group to form a ring structure containing boron.

5. An electrolyte for use in electrolytic capacitors according to claim 4, wherein said quaternary ammonium ion is asymmetric.

6. An electrolyte for use in electrolytic capacitors according to claim 4, wherein said alcoholic-hydroxy containing compounds has at least two vicinal alcoholic hydroxyl groups.

7. An electrolyte for use in electrolytic capacitors according to claim 4, wherein said alcoholic-hydroxy containing compound has no vicinal alcoholic hydroxyl groups.

8. An electrolytic capacitor comprising a capacitor element having an anode, a cathode and a separator disposed therebetween, wherein said capacitor element is impregnated with an electrolyte of claim 4.

9. An electrolyte for use in electrolytic capacitors, comprising as a solute at least one kind of quaternary ammonium salt of a boric acid complex with phosphoric acid and/or phosphoric acid ester, said quaternary ammonium salt being of the formula III:

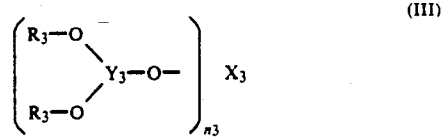

wherein $n_3$ is an integer of 1 or more;

$X_3$ is a moiety selected from the group consisting of (i) a residue obtained by removing $n_3$ hydroxyl groups from phosphoric acid and/or phosphate, (ii) a group of the formula $Y_3-O-R_3$, and (iii) a group of the formula III-A:

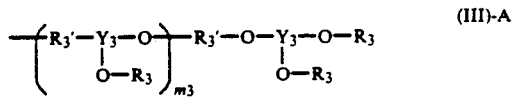

wherein $m_3$ is an integer of zero or more, $R_3'$ is a residue obtained by removing two hydroxyl groups from phosphoric acid or ester thereof containing at least two alcoholic hydroxyl groups;

$Y_3$ is a group selected from the group consisting of $>B-O-R_3)^-.Q_3^+$ and $>B-$, the $Q_3^+$ being a quaternary ammonium ion, with the proviso that at least one of the $Y_3$ groups in the general formula III is $>B-O-R_3)^-.Q_3^+$; and $R_3$s are independently hydrogen, a residue of phosphoric acid or ester thereof shown by formula III-B:

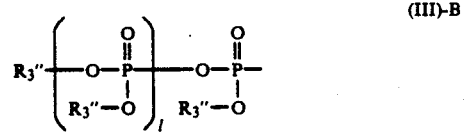

wherein l is 0 or 1; $R_3''$s are independently hydrogen, alkyl, aralkyl or derivatives thereof, said derivatives of alkyl and aralkyl containing at least one selected from the group consisting of hydroxy groups, ether linkages, and S-containing groups, and said two $R_3$ groups or an $R_3$ and $X_3$ group may be joined together through a —O—B—O— group to form a ring structure containing boron.

10. An electrolyte for use in electrolytic capacitors according to claim 9, wherein said quaternary ammonium ion is asymmetric.

11. An electolyte for use in electrolytic capacitors according to claim 10, wherein said quaternary ammonium ion is asymmetric.

12. An electrolytic capacitor comprising a capacitor element having an anode, a cathode and a separator disposed therebetween, wherein said capacitor element is impregnated with an electrolyte of claim 9.

13. An electrolyte for use in electrolytic capacitors comprising as a solute at least one kind of quaternary ammonium salt of a boric acid complex with a monocarboxylic compound, said quaternary ammonium salt being of the formula IV:

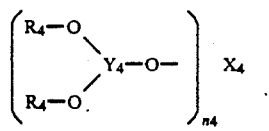   (IV)

wherein $n_4$ in an integer or 1 or more;

$X_4$ is a moiety selected from the group consisting of
(i) a residue of a monocarboxylic acid compound of the formula

wherein A is hydrogen, alkyl or aryl, and (ii) a group of the formula $-Y_4-(O-R_4)_2$ or $>Y_4-O-R_4$;

$Y_4$ is a group selected from the group consisting of
(iii) a group of the formula $\equiv B-O-R_4)^-.Q_4^+$ and
(iv) $>B-$, $Q_4^+$ being a quaternary ammonium ion with the proviso that at least one of the $Y_4$ groups in formula IV is $\equiv B-O-R_4)^-.Q_4^+$, $R_4$ is selected from the group consisting of (v) hydrogen and (vi) a residue of an monocarboxylic acid compound of the formula

wherein A is hydrogen, alkyl, aryl, or derivatives thereof, said derivatives of alkyl and aryl containing at least one amino group;

said two $R_4$ groups or an $R_4$ and $X_4$ group may be joined together through a —O—B—O— group to form a ring structure containing boron.

14. An electrolytic capacitor comprising a capacitor element having an anode, a cathode and a separator disposed therebetween, wherein said capacitor element is impregnated with an electrolyte of claim 13.

* * * * *

UNITED STATES PATENT AND TRADEMARK OFFICE
CERTIFICATE OF CORRECTION

PATENT NO. : 5,055,974
DATED : October 8, 1991
INVENTOR(S) : Washio et al.

It is certified that error appears in the above-identified patent and that said Letters Patent is hereby corrected as shown below:

at column 2, line 65 formula II-A

" 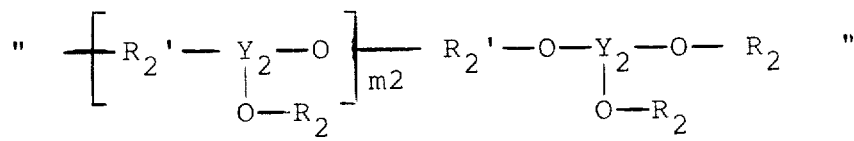 "

should read

-- 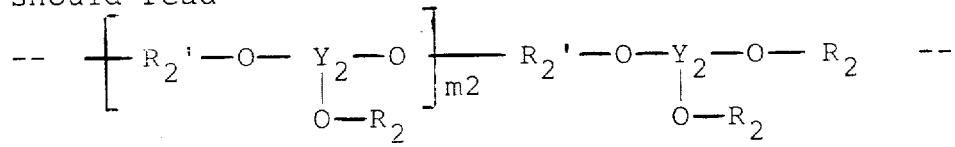 -- ;

at column 3, line 54 formula III-A

" 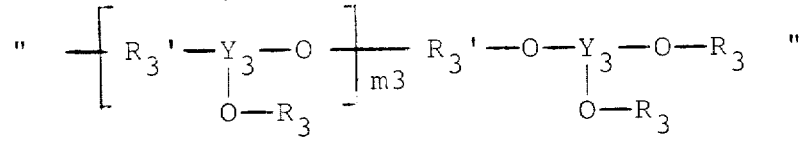 "

should read

-- 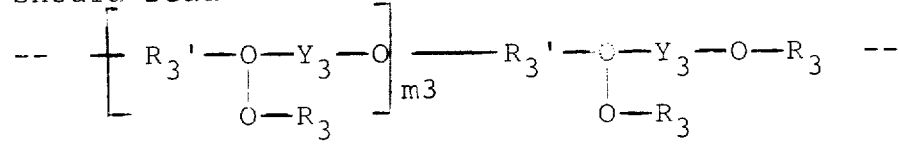 -- ;

UNITED STATES PATENT AND TRADEMARK OFFICE
CERTIFICATE OF CORRECTION

PATENT NO. : 5,055,974

DATED : October 8, 1991

INVENTOR(S) : Washio et al.

It is certified that error appears in the above-identified patent and that said Letters Patent is hereby corrected as shown below:

at column 5, line 54, " $Y_1$-O-$R_1$ " should read -- $\geq Y_1$-O-$R_1$ --;
at column 9, line 13, " $Y_2$-O-$R_2$ " should read -- $\geq Y_2$-O-$R_2$ --;
at column 9, line 17, formula II-A "
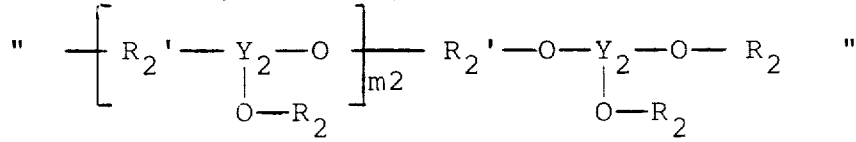
"

should read

--
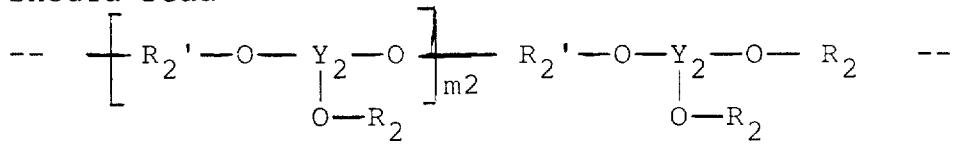
-- ;

at column 10, line 52, formula III-A

"
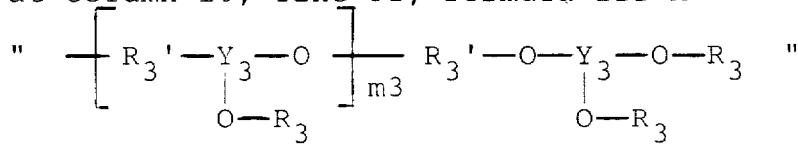
"

should read

--
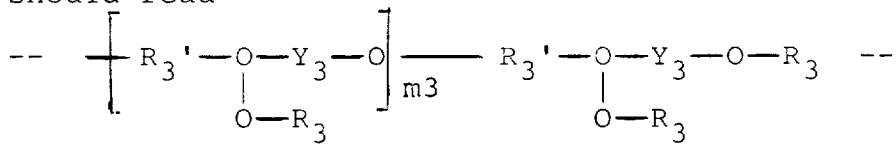
-- ;

at column 10, line 48 " $Y_3$-O-$R_3$ " should read -- $\geq Y_3$-O-$R_3$ --.

UNITED STATES PATENT AND TRADEMARK OFFICE
CERTIFICATE OF CORRECTION

PATENT NO. : 5,055,974

DATED : October 8, 1991

INVENTOR(S) : Washio et al.

It is certified that error appears in the above-identified patent and that said Letters Patent is hereby corrected as shown below:

In the Claims, Claim 1 at column 23, line 67, "$Y_1(-O-R_1)$" should read -- $Y_1-O-R_1$ --; Claim 1 at column 24, line 47, "(d) unsaturated ali-" should be deleted; column 24, line 48, "phatic" should be --(d) unsaturated aliphatic--; Claim 4 at column 25, line 33, formula II-A " 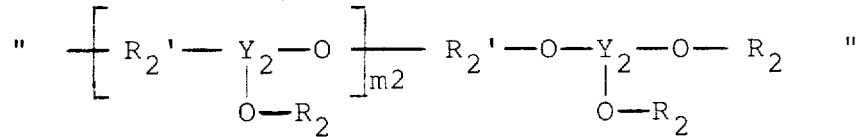 "

should read

-- 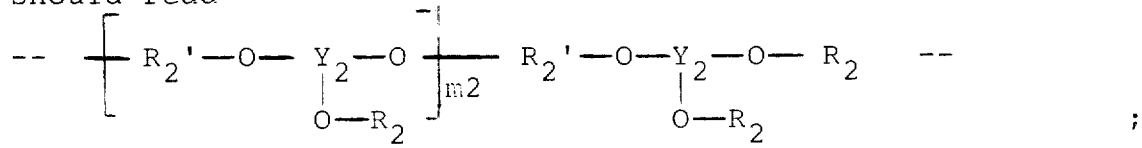 -- ;

UNITED STATES PATENT AND TRADEMARK OFFICE
CERTIFICATE OF CORRECTION

PATENT NO. : 5,055,974
DATED : October 8, 1991
INVENTOR(S) : Washio et al.

It is certified that error appears in the above-identified patent and that said Letters Patent is hereby corrected as shown below:

Claim 9 at column 26, line 34, "$Y_3$-O-$R_3$" should read -- $\geq Y_3$-O-$R_3$ --; Claim 9 at column 26, line 38, formula III-A "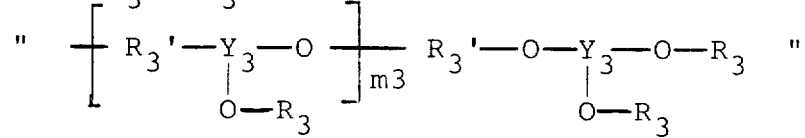"

should read

--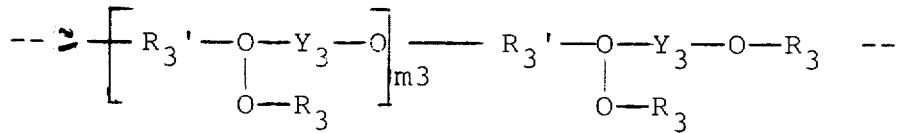--

Signed and Sealed this

Fifteenth Day of June, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,055,974
DATED : October 8, 1991
INVENTOR(S) : Washio et al.

It is certified that error appears in the above-indentified patent and that said Letters Patent is hereby corrected as shown below:

At column 3, line 54 formula III-A

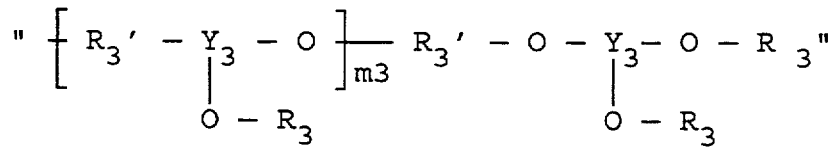

which was changed to

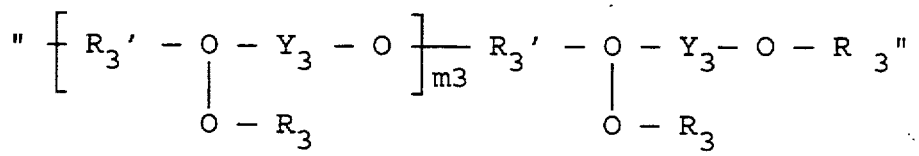

by the Certificate of Correction dated June 15, 1993 should read

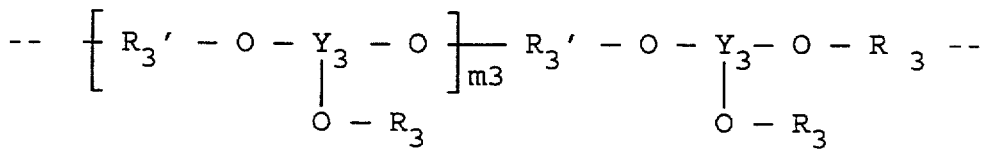

UNITED STATES PATENT AND TRADEMARK OFFICE
CERTIFICATE OF CORRECTION

PATENT NO. : 5,055,974
DATED : October 8, 1991
INVENTOR(S) : Washio et al.

It is certified that error appears in the above-indentified patent and that said Letters Patent is hereby corrected as shown below:

At column 10, line 52 formula III-A

"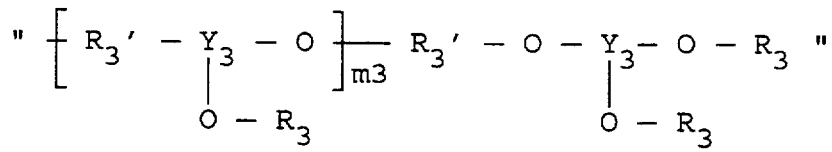"

which was changed to

"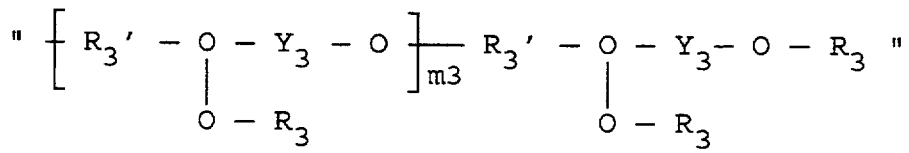"

by the Certificate of Correction dated June 15, 1993 should read

--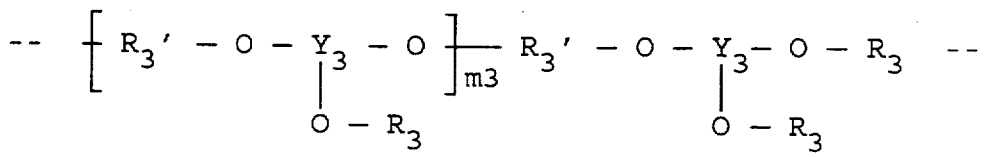--

UNITED STATES PATENT AND TRADEMARK OFFICE
CERTIFICATE OF CORRECTION

PATENT NO. : 5,055,974
DATED : October 8, 1991
INVENTOR(S) : Washio et al.

It is certified that error appears in the above-indentified patent and that said Letters Patent is hereby corrected as shown below:

In the Claims:

Claim 1 at coluumn 23, line 67, "$Y_1(-O-R_1)$" should read -- $>Y_1-O-R_1$ --.

Signed and Sealed this

Fourth Day of July, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,055,974

DATED : October 8, 1991

INVENTOR(S) : Washio, et al

It is certified that error appears in the above-indentified patent and that said Letters Patent is hereby corrected as shown below:

Claim 9 at column 26, line 38, formula (III)-A

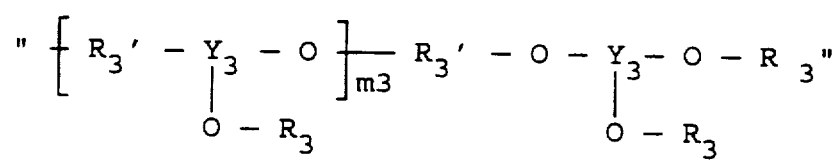

which was changed to

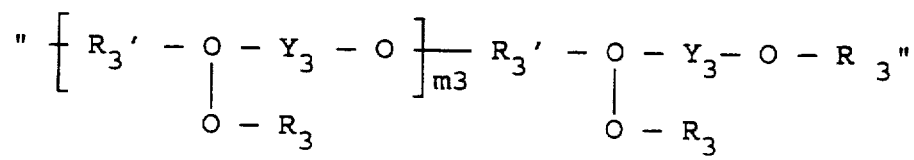

UNITED STATES PATENT AND TRADEMARK OFFICE
CERTIFICATE OF CORRECTION

PATENT NO. : 5,055,974

DATED : October 8, 1991

INVENTOR(S) : Washio, et al

It is certified that error appears in the above-indentified patent and that said Letters Patent is hereby corrected as shown below:

by the Certificate of Correction dated June 15, 1993 should read $$-\left[R_3' - O - \underset{\underset{O-R_3}{|}}{Y_3} - O\right]_{m3} R_3' - O - \underset{\underset{O-R_3}{|}}{Y_3} - O - R_3 \;--$$

Signed and Sealed this

Fifth Day of March, 1996

Attest:

BRUCE LEHMAN

Attesting Officer

Commissioner of Patents and Trademarks